United States Patent [19]

Morioka

[11] Patent Number: 5,050,452

[45] Date of Patent: Sep. 24, 1991

[54] AIR SUPPLY CONTROL SYSTEMS FOR INTERNAL COMBUSTION ENGINES

[75] Inventor: Hiroyuki Morioka, Hiroshima, Japan

[73] Assignee: Mazda Motor Corporation, Hiroshima, Japan

[21] Appl. No.: 420,138

[22] Filed: Oct. 11, 1989

[30] Foreign Application Priority Data

Oct. 15, 1988 [JP] Japan .................. 63-258368

[51] Int. Cl.$^5$ .................. F02D 23/00; F02B 33/44
[52] U.S. Cl. .................. 74/858; 74/860; 60/602; 60/612
[58] Field of Search ............ 74/857, 859, 862, 865, 74/858, 860; 60/600, 602, 612; 123/564

[56] References Cited

U.S. PATENT DOCUMENTS

| | | | |
|---|---|---|---|
| 4,620,420 | 11/1986 | Gloss et al. | 60/602 |
| 4,693,225 | 9/1987 | Abe et al. | 74/860 X |
| 4,698,972 | 10/1987 | Ueno et al. | 60/602 |
| 4,709,552 | 12/1987 | Rutschmann et al. | 60/600 |
| 4,756,161 | 7/1988 | Hirabayashi | 60/602 |
| 4,763,477 | 8/1988 | Sasaki et al. | 60/602 |
| 4,793,140 | 12/1988 | Esch | 60/600 |
| 4,930,315 | 6/1990 | Kanesaka | 60/600 |

FOREIGN PATENT DOCUMENTS

| | | | |
|---|---|---|---|
| 334228 | 9/1989 | European Pat. Off. | 60/612 |
| 55-72627 | 5/1980 | Japan | 60/600 |
| 56-41417 | 4/1981 | Japan . | |
| 56-69418 | 6/1981 | Japan | 60/612 |
| 59-160022 | 9/1984 | Japan . | |
| 62-221934 | 9/1987 | Japan | 74/862 |
| 8809432 | 12/1988 | World Int. Prop. O. | 60/602 |

*Primary Examiner*—Allan D. Herrmann
*Assistant Examiner*—Benjamin Levi
*Attorney, Agent, or Firm*—Sixbey, Friedman, Leedom & Ferguson

[57] ABSTRACT

An air supply control system for an internal combustion engine comprises a supercharging device provided for supercharging the engine and operative to work with supercharging capacity varying in accordance with operating condition of the engine, an engine speed detector for detecting speed of the engine, a shifting-up detector for detecting a shifting-up operation performed in a transmission coupled with the engine, a supercharging capacity changing arrangement operative to vary the supercharging capacity of the supercharging device to be reduced when the speed of the engine detected by the engine speed detector is relatively low and to be increased when the speed of the engine detected by the engine speed detector is relatively high, and supercharging capacity change controller for restraining the supercharging capacity changing arrangement from varying the supercharging capacity of the supercharging device to be reduced when the shifting-up operation is detected by the shifting-up detector.

11 Claims, 10 Drawing Sheets

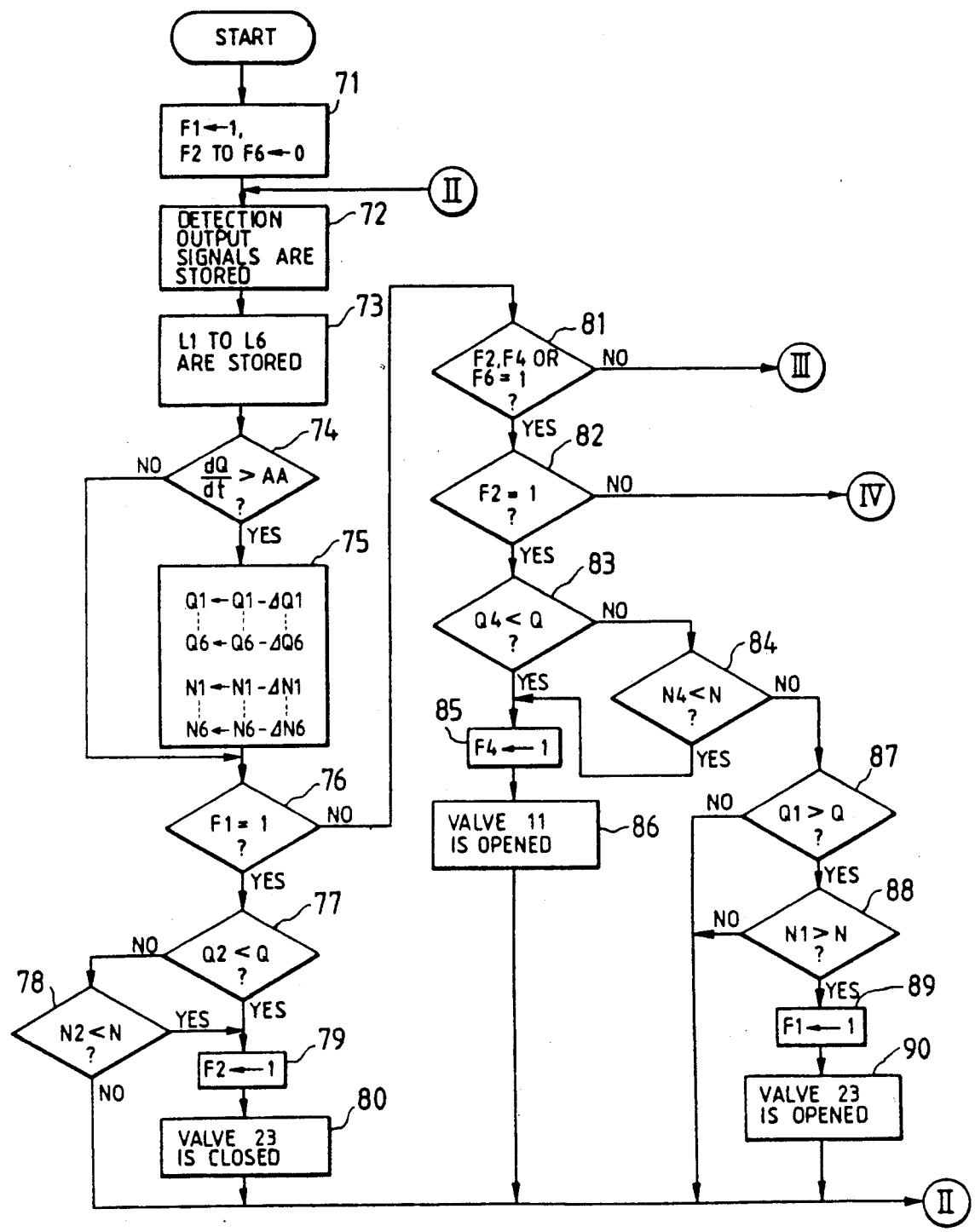
FIG. 5-a

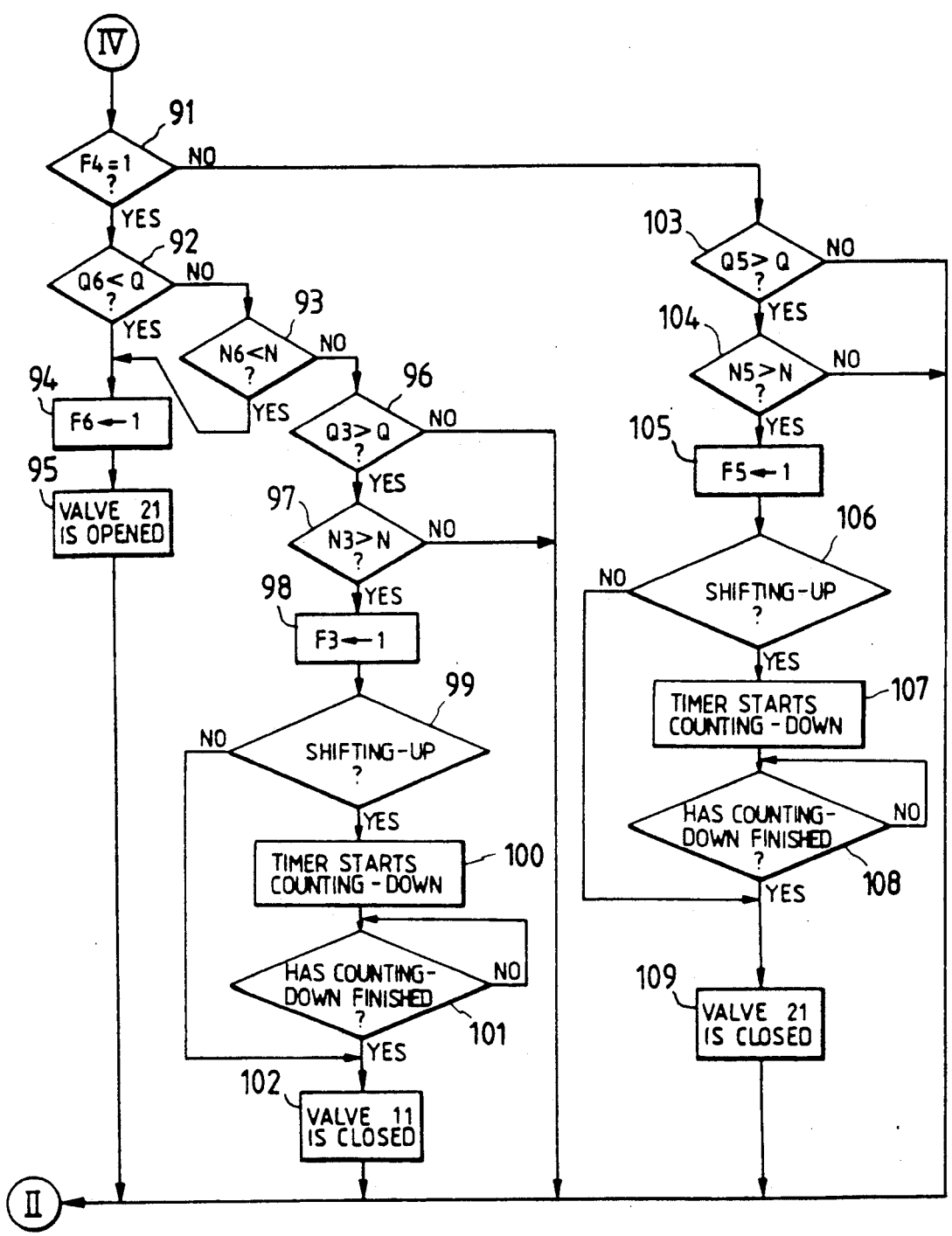
FIG. 5-b

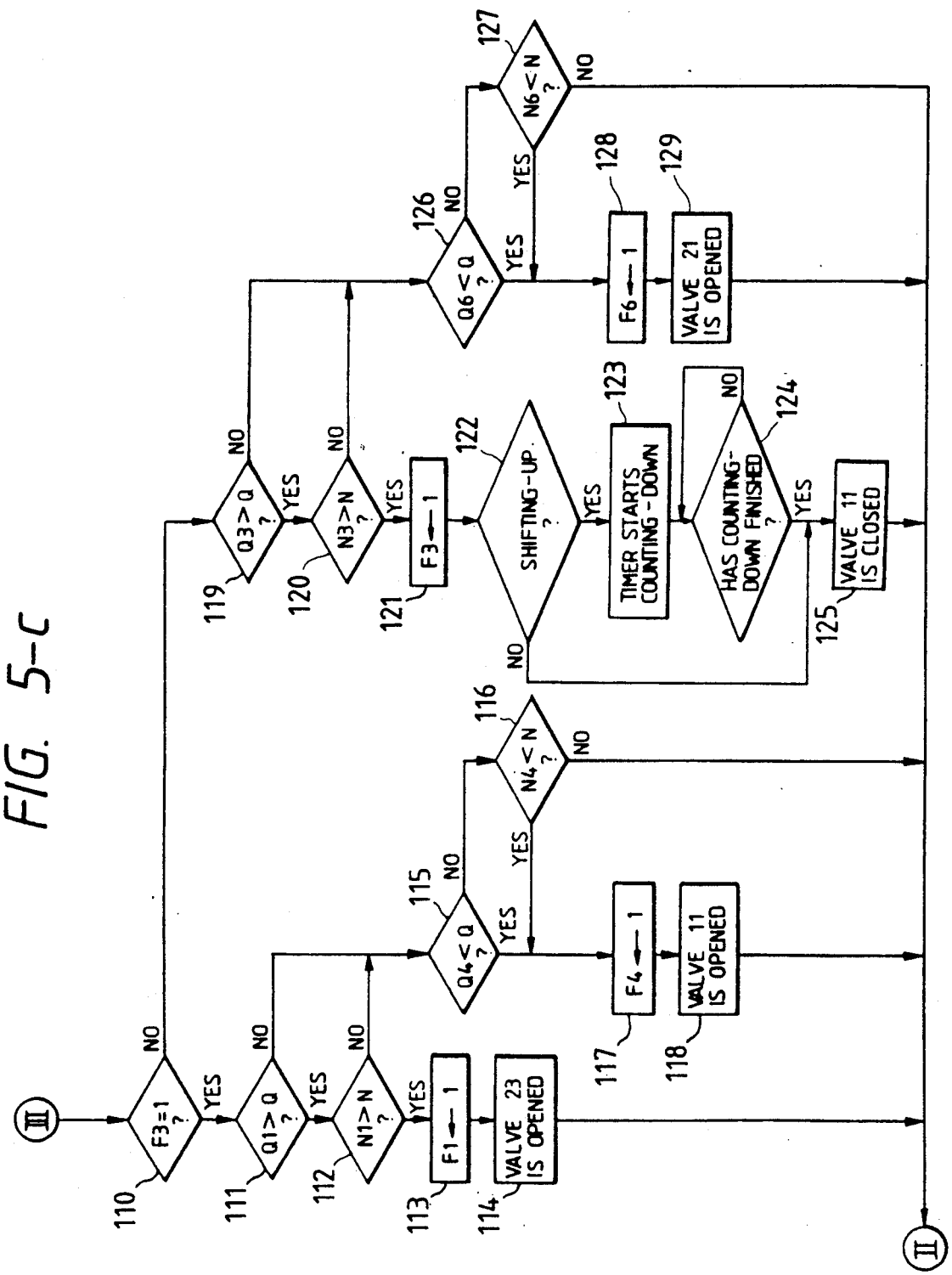
FIG. 5-c

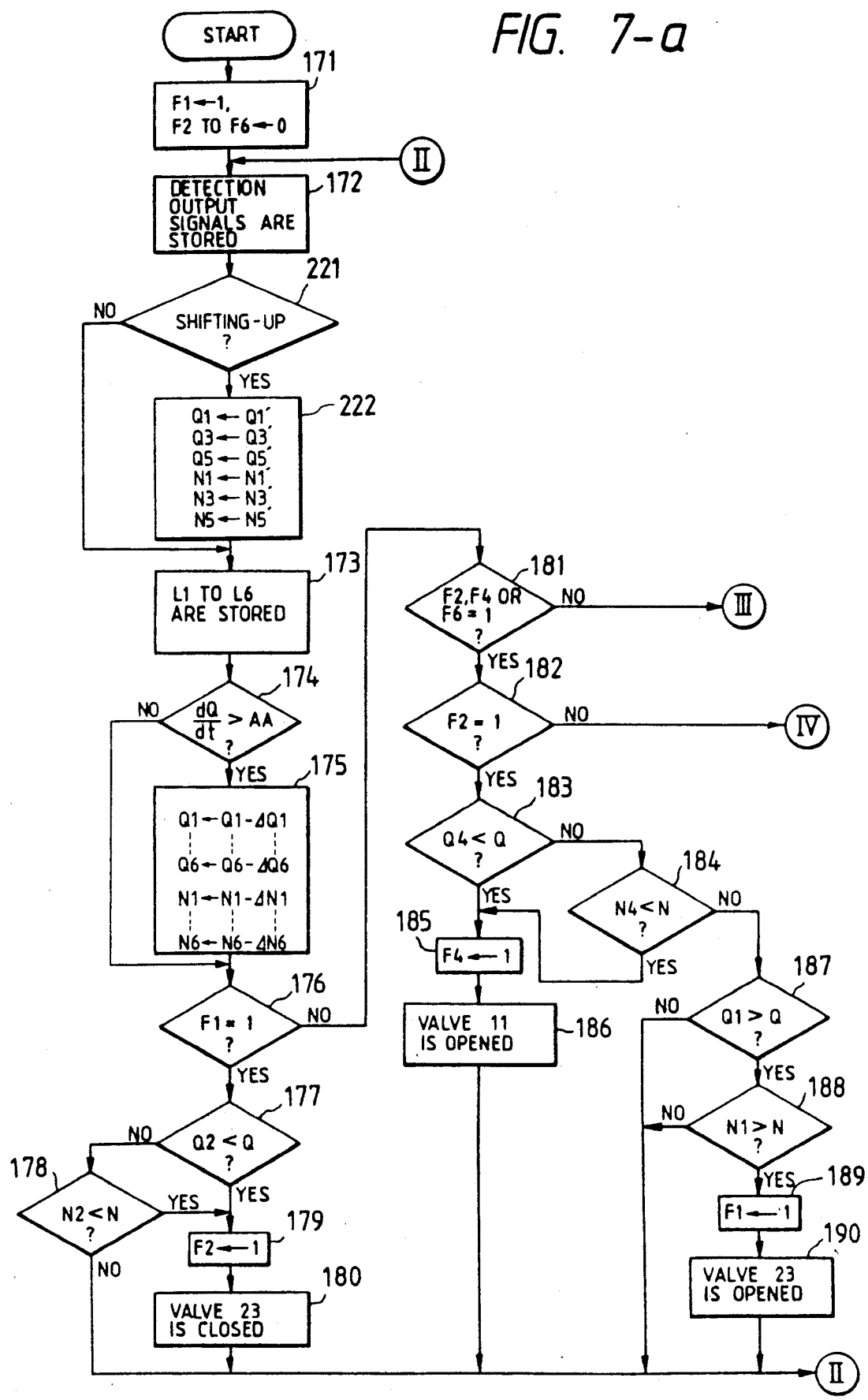
FIG. 7-a

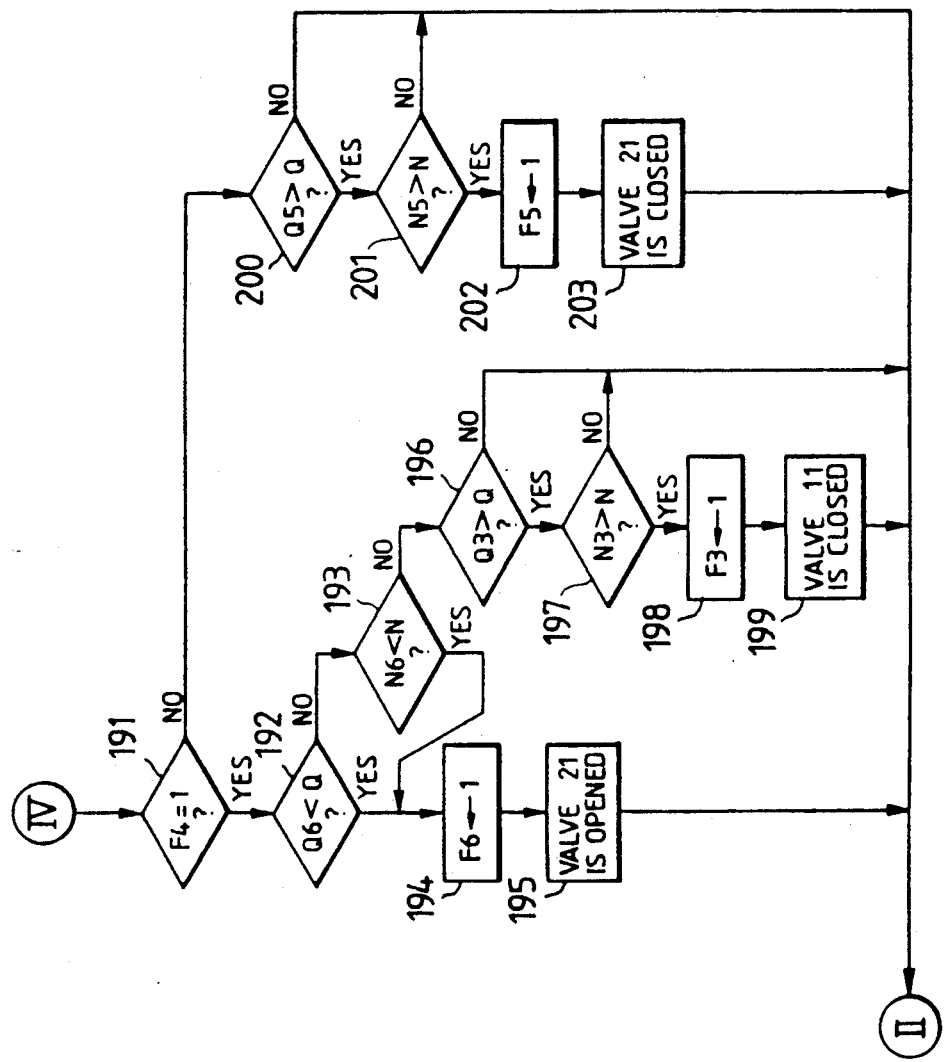
FIG. 7-b

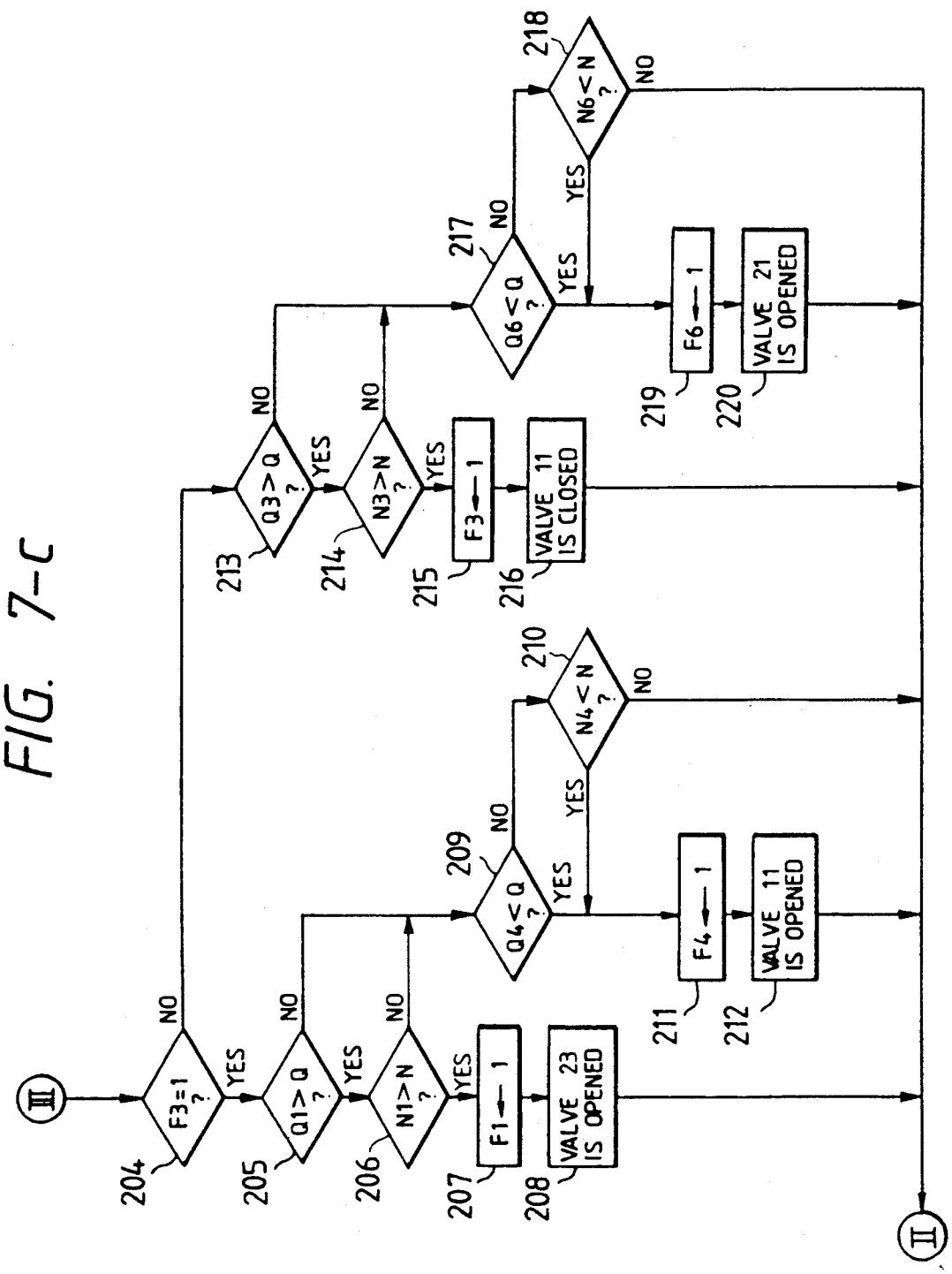

AIR SUPPLY CONTROL SYSTEMS FOR INTERNAL COMBUSTION ENGINES

BACKGROUND OF THE INVENTION

1. Field of the Invention

The present invention relates generally to air supply control systems for internal combustion engines, and more particularly to a system for controlling air supply effected to an internal combustion engine by a turbosupercharging device having variable supercharging capacity and accompanying with the internal combustion engine.

2. Description of the Prior Art

In an internal combustion engine equipped with a turbosupercharger having a turbine driven to rotate by exhaust gas flow from the engine, and a blower coupled with the turbine to rotate together with the same, a superior response in supercharging would not be expected in the case where the turbosupercharger is arranged to be relatively large in supercharging capacity and further it would not be expected that each of combustion chambers in the engine is sufficiently supercharged as occasion demands in the case where the turbosupercharger is arranged to be relatively small in supercharging capacity so as to have an improved response in supercharging.

In view of the above, there has been proposed a so-called sequentially controlled supercharging system in which a couple of turbosuperchargers of primary and secondary are provided to an internal combustion engine and so controlled that only the primary turbosupercharger works for supercharging the engine when intake air mass flow in an intake passage of the engine is relatively small and both the primary and the secondary turbosuperchargers work simultaneously for supercharging the engine when the intake air mass flow is relatively large, as disclosed in, for example, the Japanese patent applications published before examination under publication numbers 56-41417 and 59-160022. In such a system, the primary and secondary turbosuperchargers are caused to work selectively for varying their supercharging capacity to be reduced when the engine operates at a relatively low speed and to be increased when the engine operates at a relatively high speed, so that a superior response in supercharging can be obtained even on the occasion of engine operation at the relatively low speed and each of combustion chambers in the engine can be sufficiently supercharged on the occasion of engine operation at the relatively high speed.

In case of an internal combustion engine equipped with a single turbosupercharger with constant supercharging capacity, the turbosupercharger is operative to keep its rotation without reducing immediately due to inertia acting thereon when a shifting-up operation is performed in a transmission which is coupled with the engine and thereby the engine speed is reduced. Therefore, reduction in torque produced by the engine is suppressed on the occasion of the shifting-up operation.

However, in the engine which is provided with the primary and secondary turbosuperchargers controlled sequentially as described above, when the shifting-up operation is performed in the transmission so as to reduced the engine speed under a condition in which primary and secondary turbosuperchargers operate simultaneously with increased supercharging capacity, the primary and secondary turbosuperchargers are caused to reduce the supercharging capacity in response to the reduction of the engine speed and therefore torque produced by the engine is steeply reduced undesirably to cause torque shock in the engine and transmission. Especially, in the case of an engine coupled with an automatic transmission system, such torque shock as mentioned above is apt to be conspicuous.

This problem is generally encountered with an internal combustion engine provided with a previously proposed air supply control system including a supercharging device which is operative to work with supercharging capacity varying to be reduced when the engine operates at a relatively low speed and to be increased when the engine operates at a relatively high speed.

OBJECTS AND SUMMARY OF THE INVENTION

Accordingly, it is an object of the present invention to provide an air supply control system for an internal combustion engine equipped with a supercharging device operative to work with supercharging capacity varying in accordance with operating condition of the engine, which avoids the foregoing problem encountered with the prior art.

Another object of the present invention is to provide an air supply control system for an internal combustion engine equipped with a supercharging device operative to work with supercharging capacity varying to be reduced when the engine operates at a relatively low speed and to be increased when the engine operates at a relatively high speed, by which torque shock arising in the engine and transmission coupled with the engine is surely suppressed when a shifting-up operation is performed in the transmission and thereby the speed of the engine is reduced.

A further object of the present invention is to provide an air supply control system for an internal combustion engine equipped with a plurality of turbosuperchargers operative to work selectively to reduce their supercharging capacity when the engine operates at a relatively low speed and to be increased when the engine operates at a relatively high speed, by which torque shock arising in the engine and transmission coupled with the engine is surely suppressed when a shifting-up operation is performed in the transmission and thereby the speed of the engine is reduced.

According to the present invention, there is provided an air supply control system for an internal combustion engine comprising a supercharging device provided for supercharging the engine and operative to work with supercharging capacity varying in accordance with operating condition of the engine, an engine speed detector for detecting speed of the engine, a shifting-up detector for detecting a shifting-up operation performed in a transmission coupled with the engine, supercharging capacity changing means for operative to vary the supercharging capacity of the supercharging device to be reduced when the speed the engine detected by the engine speed detector is relatively low and to be increased when the speed of the engine detected by the engine speed detector is relatively high, and supercharging capacity change control means for restraining the supercharging capacity changing means from varying the supercharging capacity of the supercharging device to be reduced when the shifting-up operation is detected by the shifting-up detector.

In an embodiment of air supply control system for an internal combustion engine according to the present invention, a supercharging device comprises first and second turbosuperchargers operative to work selectively to vary their supercharging capacity, the supercharging capacity changing means is operative to cause only the first turbosupercharger to work so as to reduce the supercharging capacity when the engine operates at the relatively low speed and to cause both the first and second turbosuperchargers to work simultaneously so as to increase the supercharging capacity when the engine operates at the relatively high speed, and the supercharging capacity change control means is operative to restraining the supercharging capacity changing means from causing the second turbosupercharger to stop its operation when the shifting-up operation is performed in the transmission.

In the air supply control system thus constituted in accordance with the present invention, the supercharging device works with its supercharging capacity varying to be reduced when the engine operates at the relatively low speed and to be increased when the engine operates at the relatively high speed, so that a superior response in supercharging is obtained on the occasion of engine operation at the relatively low speed and each of combustion chambers in the engine is sufficiently supercharged on the occasion of engine operation at the relatively high speed. Further, since the supercharging device is restrained from being reduced in its supercharging capacity when the shifting-up operation is detected by the shifting-up detector, torque produced by the engine is prevented from being steeply reduced and therefore torque shock arising in the engine and transmission is surely suppressed when the shifting-up operation is performed in the transmission and thereby the speed of the engine is reduced.

The above, and other objects, features and advantages of the present invention will become apparent from the following detailed description which is to be read in conjunction with the accompanying drawings.

BRIEF DESCRIPTION OF THE DRAWINGS

FIGS. 5-a, 5-b and 5-c show a flow chart used for explaining the operation of the embodiment shown in FIG. 2 in which various valves are controlled in the first control manner:

FIGS. 7-a, 7-b and 7-c show a flow chart used for explaining the operation of the embodiment shown in FIG. 2 in which various valves are controlled in the second control manner.

DESCRIPTION OF THE PREFERRED EMBODIMENT

Figure 1:
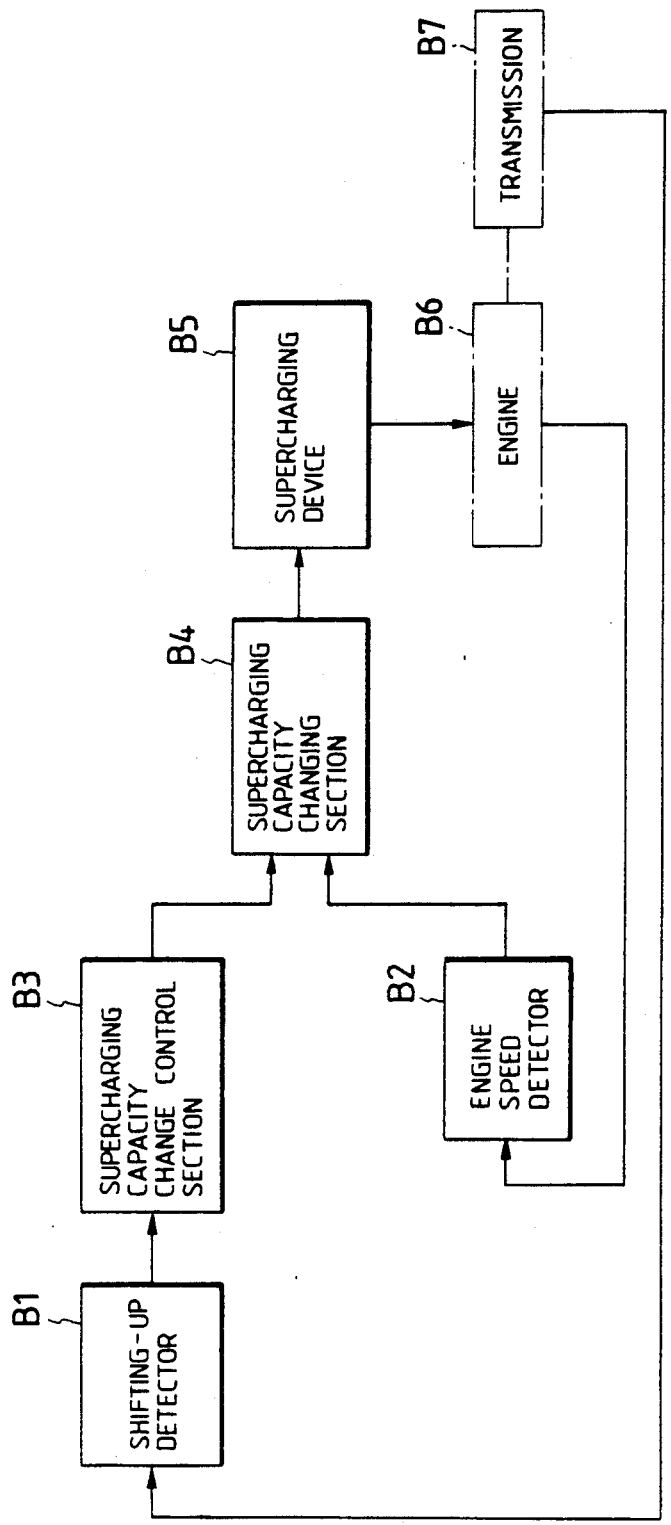
FIG. 1 is a block diagram illustrating the basic arrangement of an air supply control system for an internal combustion engine according to the present invention.

FIG. 1 illustrates a functional block diagram of a system incorporating the present invention. In the functional block diagram of FIG. 1, the system comprises a shifting-up detector B1, an engine speed detector B2, a supercharging capacity change control section B3, a supercharging capacity changing section B4 and a supercharging device B5, and the supercharging device B5 is connected with an internal combustion engine B6 coupled with a transmission B7, to which the system is applied.

The supercharging device B5 is provided for supercharging the internal combustion engine B6 with supercharging capacity varying in accordance with operating conditions of the internal combustion engine B6. The engine speed detector B2 is operative to detect speed of the internal combustion engine B6. The supercharging capacity changing section B4 is operative to vary the supercharging capacity of the supercharging device B5 to be reduced when the speed the internal combustion engine B6 detected by the engine speed detector B2 is relatively low and to be increased when the speed of the internal combustion engine B6 detected by the engine speed detector B2 is relatively high. The shifting-up detector B1 is operative to detect a shifting-up operation performed in the transmission B7. The supercharging capacity change control section B3 is operative to restrain the supercharging capacity changing section B4 from varying the supercharging capacity of the supercharging device B5 to be reduced when the shifting-up operation is detected by the shifting-up detector B1.

Figure 2:
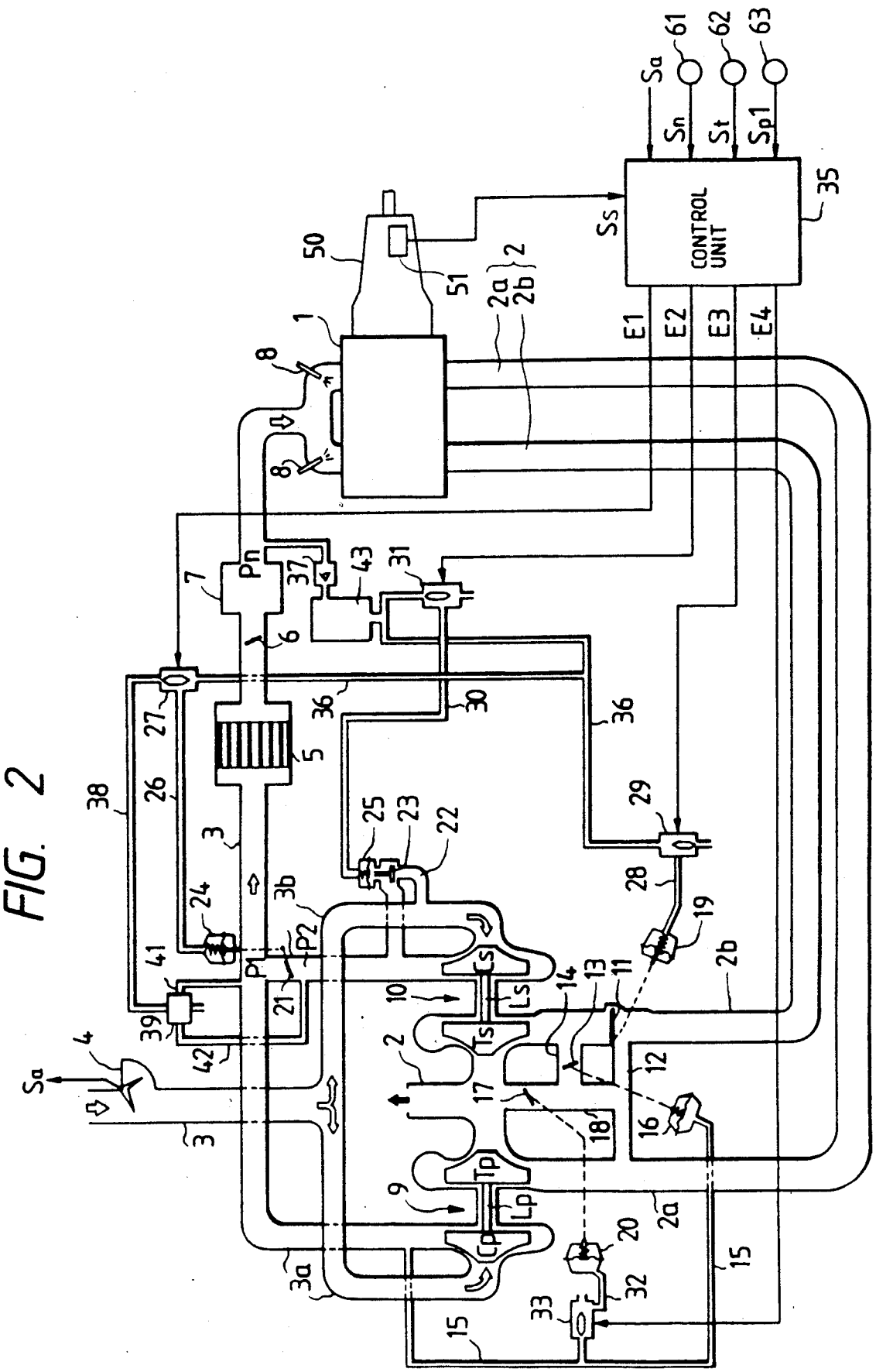
FIG. 2 is a schematic illustration showing an embodiment of air supply control system for an internal combustion engine according to the present invention, together with essential parts of an engine to which the embodiment is applied.

FIG. 2 illustrates an embodiment of air supply control system according to the present invention, together with a part of an engine to which the embodiment is applied.

Referring to FIG. 2, an internal combustion engine 1, which is, for example, a rotary engine having a couple of rotors each forming an operating chamber having the capacity of, for example, 654 cubic centimeters and with which a transmission 50 operative to take selectively a plurality of speed ranges therein is connected, is provided with an exhaust passage 2 for discharging exhaust gas from the engine 1 and an intake passage 3 for supplying the engine 1 with intake air. The transmission 50 comprises an automatic transmission including a torque converter coupled with an output shaft of the rotary engine 1 and a torque transmitting gear arrangement coupled with the torque converter. The exhaust passage 2 includes first and second separated exhaust passages 2a and 2b, and the intake passage 3 includes first and second branched intake passages 3a and 3b which are separated from each other at a location downstream from an air flow sensor 4 provided for detecting intake air mass flow in the intake passage 3 and merged into each other at a location upstream to an intercooler 5 provided for cooling the intake air in the intake passage 3. A portion of the intake passage 3 downstream from the intercooler 5 is provided with a throttle valve 6, a surge chamber 7 and fuel injectors 8.

A primary turbosupercharger 9 is provided with a turbine Tp disposed in the first separated exhaust passage 2a to be driven to rotate by the exhaust gas and a blower Cp disposed in the first branched intake passage 3a and coupled through a rotating shaft Lp with the turbine Tp. A secondary turbosupercharger 10 is also provided with a turbine Ts disposed in the second separated exhaust passage 2b to be driven to rotate by the exhaust gas and a blower Cs disposed in the second branched intake passage 3b and coupled through a rotating shaft Ls with the turbine Ts.

A portion of the first branched intake passage 3a upstream to the blower Cp and a portion of the second branched intake passage 3b upstream to the blower Cs are arranged in a line to form a branched portion, so that pressure waves produced in one of the first and second branched intake passages 3a and 3b are easy to propagate to the other of the first and second branched intake passages 3a and 3b but hard to propagate toward the air flow sensor 4.

An exhaust cutoff valve 11 is disposed in a portion of the second separated exhaust passage 2b upstream to the turbine Ts. This exhaust cutoff valve 11 is operative to close the second separated exhaust passage 2b in order to prevent the exhaust gas from being supplied to the turbine Ts so that only the primary turbosupercharger 9 works in a situation where intake air mass flow supplied to the engine 1 is relatively small.

A portion of the second separated exhaust passage 2b upstream to the exhaust cutoff valve 11 is connected through a connecting passage 12 with a portion of the first separated exhaust passage 2a upstream to the turbine Tp. The connecting passage 12 is also connected with a portion of the exhaust passage 2 downstream from the turbines Tp and Ts through a bypass passage 18 in which a waste gate valve 17 is provided. A portion of the bypass passage 18 upstream to the waste gate valve 17 is connected with a portion of the second separated exhaust passage 2b between the exhaust cutoff valve 11 and the turbine Ts through an exhaust snifting passage 14 in which an exhaust snifting valve 13 is provided.

The exhaust snifting valve 13 is driven by a diaphragm actuator 16 and a pressure chamber of the diaphragm actuator 16 is coupled through a control pressure pipe 15 with a portion of the first branched intake passage 3a downstream from the blower Cp.

An intake air cutoff valve 21 is disposed in a portion of the second branched intake passage 3b downstream of the blower Cs. The second branched intake passage 3b is provided also with an intake air relief passage 22 detouring the turbine Ts and having therein an intake air relief valve 23. The intake air cutoff valve 21 is driven by a diaphragm actuator 24, and the intake air relief valve 23 is driven by a diaphragm actuator 25.

A control pressure pipe 26 extending from the diaphragm actuator 24 for driving the intake air cutoff valve 21 is connected with an output port of a three-way solenoid valve 27, and a control pressure pipe 28 extending from a diaphragm actuator 19 for driving the exhaust cutoff valve 11 is connected with an output port of a three-way solenoid valve 29. Further, a control pressure pipe 30 extending from the diaphragm actuator 25 for driving the intake air relief valve 23 is connected with an output port of a three-way solenoid valve 31, and a control pressure pipe 32 extending from a diaphragm actuator 20 for driving the waste gate valve 17 is connected with an output port of a three-way solenoid valve 33. The three-way solenoid valves 27, 29, 31 and 33 are controlled by a control unit 35 constituted by a microcomputer.

The control unit 35 is provided with detection output signals Sa, Sn, Ss, St and Sp1 obtained from the air flow sensor 4, from an engine speed detector 61 for detecting the speed of the engine 1 (engine speed), from a shifting-up detector 51 provided on the transmission 50 for detecting a shifting-up operation performed in the transmission 50, from a throttle sensor 62 for detecting opening degree of the throttle valve 6 (opening degree of throttle), and from an air pressure sensor 63 for detecting an air pressure P1 at a portion downstream from the blower Cp in the first branched intake passage 3a, respectively, and operative to produce control signals E1 to E4 selectively based on the detection output signals Sa, Sn, Ss, St and Sp1 and to supply the three-way solenoid valve 27 with the control signal E1, the three-way solenoid valve 31 with the control signal E2, the three-way solenoid valve 29 with the control signal E3, and the three-way solenoid valve 33 with the control signal E4.

One of input ports of the three-way solenoid valve 29 is open to the atmosphere and the other of the input ports is connected through a pipe 36 with a negative pressure tank 43 to which negative pressure Pn obtained at a portion downstream from the throttle valve 6 in the intake passage 3 is supplied through a check valve 37. One of input ports of the three-way solenoid valve 27 is connected through the pipe 36 with the negative pressure tank 43 and the other of the input ports is connected through a pipe 38 with a pressure difference detecting valve 39.

Figure 3:
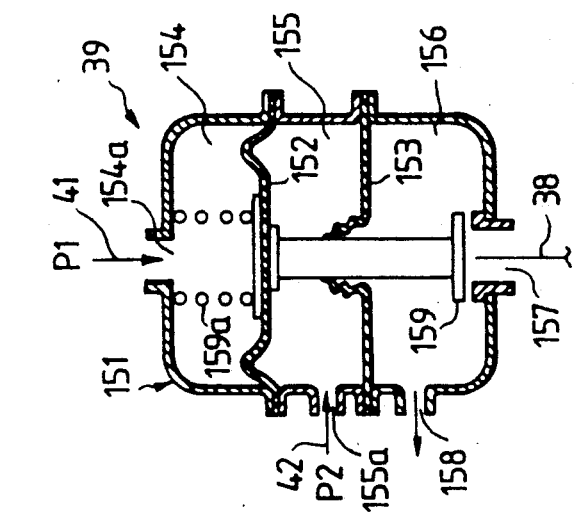
FIG. 3 is a schematic illustration showing a pressure difference detecting valve employed in the embodiment shown in FIG. 2.

As shown in FIG. 3, the pressure difference detecting valve 39 has a housing 151 in which three chambers 154, 155 and 156 are formed with diaphragms 152 and 153. The chambers 154 and 155 are provided with input ports 154a and 155a, respectively, and the chamber 156 is provided with an open port 158 and an output port 157 connected with the pipe 38. The input port 154a is connected through a pipe 41 with the portion of the first branched intake passage 3a downstream from the blower Cp so as to be supplied with the air pressure P1, and the input port 155a is connected through a pipe 42 with a portion of the second branched intake passage 3b upstream to the intake air cutoff valve 21 so as to be supplied with an air pressure P2 at a portion upstream to the intake air cutoff valve 21 in the second branched intake passage 3b.

The pressure difference detecting valve 39 is provided further with a valve body 159 connected with the diaphragms 152 and 153 and biased by a spring 159a disposed in the chamber 154. This valve body 159 is operative to keep the output port 157 open so as to open the output port 157 to the atmosphere through the chamber 156 and the open port 158 when a pressure difference between the air pressures P1 and P2 is relatively large and keep the output port 157 closed when the pressure difference between the air pressures P1 and P2 is equal to or smaller than a predetermined pressure value $\Delta P$. Accordingly, when the control pressure pipe 26 is communicated with the pipe 38 through the three-way solenoid valve 27 controlled by the control signal E1 and the pressure difference between the air pressures P1 and P2 is larger than the predetermined pressure value $\Delta P$, the diaphragm actuator 24 is opened to the atmosphere and thereby the intake air cutoff valve 21 is opened. On the other hand, when the control pressure pipe 26 is communicated with the pipe 36 through the three-way solenoid valve 27 controlled by the control signal E1, the negative pressure is applied to the diaphragm actuator 24 and thereby the intake air cutoff valve 21 is closed.

When the control pressure pipe 28 is communicated with the pipe 36 through the three-way solenoid valve 29 controlled by the control signal E3, the negative pressure is applied to the diaphragm actuator 19 and thereby the exhaust cutoff valve 11 is closed, so that only the primary turbosupercharger 9 is caused to work. On the other hand, when the control pressure pipe 28 is opened to the atmosphere through the three-way solenoid valve 29 controlled by the control signal E3, the exhaust cutoff valve 11 is opened, so that the secondary turbosupercharger 10 is caused to work.

Figure 4:
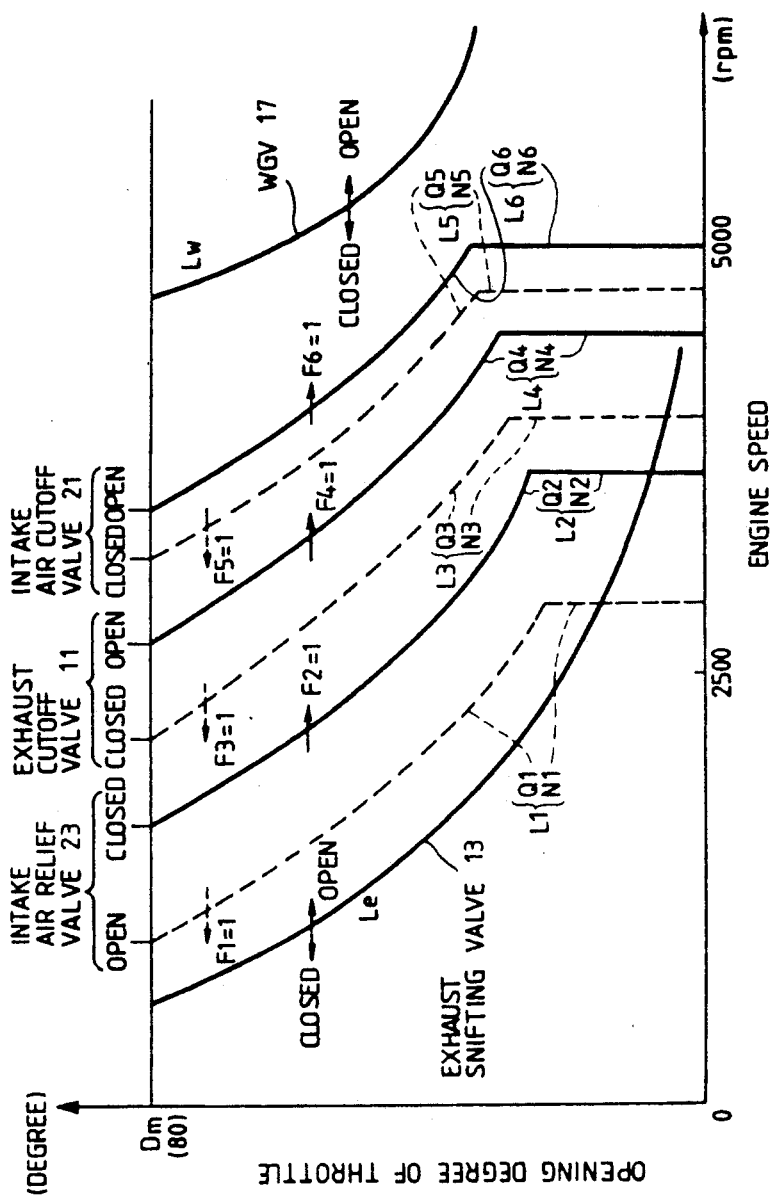
FIG. 4 is a characteristic chart used for explaining the operation of various valves employed in the embodiment shown in FIG. 2 and controlled in a first control manner.

FIG. 4 is a characteristic chart showing the operating conditions of the exhaust cutoff valve 11, exhaust snifting valve 13, waste gate valve 17, intake air cutoff valve 21 and intake air relief valve 23. This characteristic chart of FIG. 4 has an axis of abscissa representing engine speed and an axis of ordinate representing engine load embodied by opening degree of throttle, the maximum value of which is indicated by Dm, and is stored in the form of data map in a memory contained in the control unit 35.

According to the characteristic chart of FIG. 4, the waste gate valve 17 is changed to be open from closed and to be closed from open in accordance with a line Lw in common, and the exhaust snifting valve 13 is changed to be open from closed and to be closed from open in accordance with a line Le in common. On the other hand, the intake air relief valve 23 is changed to be open from closed in accordance with a line L1 which indicates the operating condition of engine in which the engine 1 operates with intake air mass flow Q1 and the operating condition of engine in which the engine 1 operates at engine speed N1 and to be closed from open in accordance with a line L2 which indicates the operating condition of engine in which the engine 1 operates with intake air mass flow Q2 and the operating condition of engine in which the engine 1 operates at engine speed N2, the exhaust cutoff valve 11 is changed to be closed from open in accordance with a line L3 which indicates the operating condition of engine in which the engine 1 operates with intake air mass flow Q3 and the operating condition of engine in which the engine 1 operates at engine speed N3 and to be open from closed in accordance with a line L4 which indicates the operating condition of engine in which the engine 1 operates with intake air mass flow Q4 and the operating condition of engine in which the engine 1 operates at engine speed N4, and the intake air cutoff valve 21 is changed to be closed from open in accordance with a line L5 which indicates the operating condition of engine in which the engine 1 operates with intake air mass flow Q5 and the operating condition of engine in which the engine 1 operates at engine speed N5 and to be open from closed in accordance with a line L6 which indicates the operating condition of engine in which the engine 1 operates with intake air mass flow Q6 and the operating condition of engine in which the engine 1 operates at engine speed N6.

The three-way solenoid valve 31 has its input ports, one of which is opened to the atmosphere and the other of which is connected with the negative pressure tank 43. In the case where the engine speed is relatively low, the negative pressure Pn is applied through the three-way solenoid valve 31 and the control pressure pipe 30 to the intake air relief valve 23 and whereby the intake air relief valve 23 keeps the intake air relief passage 22 open. Then, the three-way solenoid valve 31 is changed to open the control pressure pipe 30 to the atmosphere by the control signal E2 from the control unit 35, so that the intake air relief valve 23 shuts the intake air relief passage 22, before the exhaust cutoff valve 11 and the intake air cutoff valve 21 are opened during the period of time in which the engine speed is increasing, as shown in FIG. 4.

On the characteristic chart of FIG. 4, an operating area having the line L6 as a lower boundary is set to correspond to the operating condition of the engine 1 in which intake air mass flow fed to the combustion chambers formed in the engine 1 is to be relatively large, and each of an operating area between the lines L4 and L6, an operating area between the lines L2 and L4, and operating area having the line L2 as an upper boundary is set to correspond to the operating condition of the engine 1 in which intake air mass flow fed to the combustion chambers formed in the engine 1 is to be relatively small.

When the operating condition of the engine 1 resides in the operating area having the line L2 as an upper boundary, the control unit 35 is operative to keep each of the exhaust cutoff valves 11 and the intake air cutoff valve 21 closed and, contrary, the intake air relief valve 23 open, so that only the primary turbosupercharger 9 is caused to work for supercharging the engine 1. Then, when the intake air mass flow or the engine speed has increased to cross the line L2 and the operating condition of the engine 1 has moved into the operating area between the lines L2 and L4, the control unit 35 is operative to close the intake air relief valve 23. In process of this, before the intake air relief valve 23 is closed, the exhaust snifting valve 13 is opened when the intake air mass flow has increased to cross the line Le and thereby the exhaust gas is supplied slightly to the turbine Ts of the secondary turbosupercharger 10 through the exhaust snifting passage 14 under a condition in which the intake air relief valve 23 is open. This results in that the turbine Ts is driven to rotate by the exhaust gas flowing through the exhaust snifting passage 14 so that the secondary turbosupercharger 10 is subjected to its preliminary rotation before the exhaust cutoff valve 11 is opened.

After that, when the intake air mass flow or the engine speed has further increased to cross the line L4 and the operating condition of the engine 1 has moved into the operating area between the lines L4 and L6, the control unit 35 is operative to open the exhaust cutoff valve 11, and then, when the intake air mass flow or the engine speed has still further increased to cross the line L6 and the operating condition of the engine 1 has moved into the operating area having the line L6 as a lower boundary, the control unit 35 is operative to open the intake air cutoff valve 21, so that the turbine Tp of the primary turbosupercharger 9 and the turbine Ts of the secondary turbosupercharger 10 are driven to rotate by the exhaust gas passing through the first and second separated exhaust passages 2a and 2b respectively and thereby both the primary and secondary turbosuperchargers 9 and 10 are caused to work for supercharging the engine 1.

As described above, since the secondary turbosupercharger 10 is rotated preliminarily by the exhaust gas supplied thereto through the exhaust snifting valve 13 under the condition in which the intake air relief valve 23 is open before it commences to work for supercharging the engine 1 and the intake air relief valve 23 is closed before the exhaust cutoff valve 11 is opened, the secondary turbosupercharger 10 under the sufficiently high preliminary rotation commences to work for supercharging the engine 1, and consequently, the response in supercharging by the secondary turbosupercharger 10 is improved and torque shock arising on the engine 1 is surely suppressed when the secondary turbosupercharger 10 commences to work for supercharging the engine 1.

In the case where the engine 1 is accelerated, the operating area having the line L6 as a lower boundary on the characteristic chart of FIG. 4, which corresponds to the operating condition of the engine 1 wherein the primary and secondary turbosuperchargers 9 and 10 work simultaneously and referred to as a first two-charger operating area hereinafter, is extended toward operating areas of smaller opening degree of throttle and lower engine speed. In other words, when the engine 1 is accelerated, the control unit 35 is operative substantially to shift the line L6 on the characteristic chart shown in FIG. 4 toward areas of smaller opening degree of throttle and lower engine speed. On the occasion of such shift of the line 6, lines L1 to L5 on the characteristic chart of FIG. 4 are also shifted substantially toward areas of smaller opening degree of throttle and lower engine speed by the control unit 35.

The extension of the first two-charger operating area, that is, the shift of each of the lines L1 to L6 as mentioned above may be varied to increase in accordance with increment of the acceleration of the engine 1. The acceleration of the engine 1 is detected, for example, based on a variation rate of intake air mass flow (dQ/dt), which becomes equal to or more than a predetermined value when the engine 1 is accelerated.

After the operating condition of the engine 1 has come into the first two-charger operating area, when the operating condition of the engine 1 resides in an operating area having the line L5 as a lower boundary, which is referred to as a second two-charger operating area hereinafter, the control unit 35 is operative to keep each of the exhaust cutoff valves 11 and the intake air cutoff valve 21 open and, contrary, the intake air relief valve 23 closed, so that both the primary and secondary turbosuperchargers 9 and 10 are caused to work for supercharging the engine 1. Then, when the intake air mass flow or the engine speed has decreased to cross the line L5 and the operating condition of the engine 1 has moved into an operating area between the lines L5 and L3, the control unit 35 is operative to close the intake air cutoff valve 21.

Subsequently, when the intake air mass flow in the engine 1 or the engine speed has further decreased to cross the line L3 and the operating condition of the engine 1 has moved into an operating area between the lines L3 and L1, the control unit 35 is operative to close the exhaust cutoff valve 11, so that the exhaust gas passing through the second separated exhaust passage 2b is ceased to be directly supplied to the turbine Ts of the secondary turbosupercharger 10. Then, when the intake air mass flow or the engine speed has still further decreased to cross the line L1 and the operating condition of the engine 1 has moved into an operating area having the line L1 as an upper boundary, the control unit 35 is operative to open the intake air relief valve 23.

Further, after the intake air relief valve 23 is opened, the exhaust snifting valve 13 is closed when the intake air mass flow or the engine speed has decreased to cross the line Le and thereby the exhaust gas is ceased to be supplied slightly to the turbine Ts of the secondary turbosupercharger 10 through the exhaust snifting passage 14. This results in that the turbine Ts is not driven to rotate by the exhaust gas so that the secondary turbosupercharger 10 is caused to stop working and only the primary turbosupercharger 9 is caused to work for supercharging the engine 1.

In this embodiment, when a shifting-up operation is performed in the transmission 50 coupled with the engine 1 under a condition in which the operating condition of the engine 1 resides in the second two-charger operating area partitioned by the line L5 on the characteristic chart of FIG. 4, the secondary turbosupercharger 10 is not stopped working immediately so that both the primary and secondary turbosuperchargers 9 and 10 are kept in operation for a predetermined period even though the engine speed is so reduced due to the shifting-up operation that the operating condition of the engine 1 is moved into an operating area other than the second two-charger operating area on the characteristic chart of FIG. 4, and after the predetermined period has passed, the secondary turbosupercharger 10 is caused to stop working if the operating condition of the engine 1 resides in the area other than the second two-charger operating area on the characteristic chart of FIG. 4 at that time.

For such a control, the control unit 35 is operative to cause a timer contained therein to start measuring the predetermined period when the shifting-up operation is performed in the transmission is detected by the shifting-up detector 51 under a condition in which the operating condition of the engine 1 resides in the second two-charger operating area on the characteristic chart of FIG. 4. Then, after the timer has finished measuring the predetermined period, the control unit 35 is operative to close the intake air cutoff valve 21 and the exhaust cutoff valve 11 successively, to open the intake air relief valve 23 and to close the exhaust snifting valve 13, so that the secondary supercharger 10 is caused to stop working.

Since the secondary turbosupercharger 10 is thus restrained to stop working for the predetermined period when the shifting-up operation is performed in the transmission 50, torque produced by the engine 1 is not steeply reduced and therefore torque shock arising in the engine 1 and the transmission 50 is surely suppressed when the shifting-up operation is performed in the transmission 50 and thereby the engine speed is so reduced that the operating condition of the engine 1 is moved into some operating area other than the second two-charger operating area on the characteristic chart of FIG. 4.

The air pressure P1 is applied through the control pressure pipe 15 extending from the diaphragm actuator 16 to one of input ports of the three-way solenoid valve 33. When the engine speed and the opening degree of throttle are equal to or more than respective predetermined values and the air pressure P1 is equal to or higher than a predetermined pressure value, the three-way solenoid valve 33 is opened by the control signal E4 from the control unit 35 so as to apply the air pressure P1 to the diaphragm actuator 20 and thereby the diaphragm actuator 20 causes the waste gate valve 17 to make the bypass passage 18 open. The other of input ports of the three-way solenoid valve 33 is opened to the atmosphere and the waste gate valve 17 shuts the bypass passage 18 when the diaphragm actuator 20 is opened to the atmosphere through the three-way solenoid valve 33.

One example of an operation program for controlling the exhaust cutoff valve 11, intake air cutoff valve 21 and intake air relief valve 23 as described above is carried out in the control unit 35 in accordance with a flow chart shown in FIGS. 5-a, 5-b and 5-c.

According to the flow chart shown in FIGS. 5-a, 5-b and 5-c, first, in step 71, an initial arrangement for setting a flag F1 to be 1 and setting each of flags F2 to F6 to be 0 is conducted. As shown in FIG. 4, after the initial arrangement, the flag F1 is set to be 1 and each of the flags F2 to F6 is set to be 0 when the intake air mass flow or the engine speed is decreased to cross the line L1, the flag F2 is set to be 1 and each of the flags F1 and F3 to F6 is set to be 0 when the intake air mass flow or the engine speed is increased to cross the line L2, the flag F3 is set to be 1 and each of the flags F1, F2 and F4 to F6 is set to be 0 when the intake air mass flow or the engine speed is decreased to cross the line L3, the flag F4 is set to be 1 and each of the flags F1 to F3, F5 and F6 is set to be 0 when the intake air mass flow or the engine speed is increased to cross the line L4, the flag F5 is set to be 1 and each of the flags F1 to F4 and F6 is set to be 0 when the intake air mass flow or the engine speed is decreased to cross the line L5, and the flag F6 is set to be 1 and each of the flags F1 to F5 is set to be 0 when the intake air mass flow or the engine speed is increased to cross the line L6.

Then, in step 72, the detection output signals Sa, Sn, Ss, St and Sp1 obtained from the air flow sensor 4, the engine speed detector 61, the shifting-up detector 51, the throttle sensor 62 and the air pressure sensor 63, respectively, are stored. Further, the intake air mass flow Q1 and the engine speed N1 representing the line L1, the intake air mass flow Q2 and the engine speed N2 representing the line L2, the intake air mass flow Q3 and the engine speed N3 representing the line L3, the intake air mass flow Q4 and the engine speed N4 representing the line L4, the intake air mass flow Q5 and the engine speed N5 representing the line L5, and the intake air mass flow Q6 and the engine speed N6 representing the line L6 are stored, in step 73.

After that, in step 74, it is checked whether the variation rate of intake air mass flow (dQ/dt), which is obtained based on the detection output signal Sa representing intake air mass flow Q in the intake passage 3, is lager than a predetermined value AA or not. If the variation rate of intake air mass flow dQ/dt is larger than the predetermined value AA, the intake air mass flows Q1, Q2, Q3, Q4, Q5 and Q6 and the engine speeds N1, N2, N3, N4, N5 and N6 stored in the step 73 are modified respectively to shift the lines L1 to L6 toward areas of smaller opening degree of throttle and lower engine speed on the characteristic chart of FIG. 4, in step 75, and then the process advances to step 76. The modifications of the intake air mass flows Q1 to Q6 are performed by subtracting predetermined modifying values $\Delta Q1$, $\Delta Q2$, $\Delta Q3$, $\Delta Q4$, $\Delta Q5$ and $\Delta Q6$ from the intake air mass flows Q1, Q2, Q3, Q4, Q5 and Q6, respectively, and the modifications of the engine speeds N1 to N6 are performed by subtracting predetermined modifying values $\Delta N1$, $\Delta N2$, $\Delta N3$, $\Delta N4$, $\Delta N5$ and $\Delta N6$ from the engine speeds N1, N2, N3, N4, N5 and N6, respectively.

If it is clarified in the step 74 that the variation rate of intake air mass flow dQ/dt is equal to or smaller than the predetermined value AA, the process advances directly to step 76.

In the step 76, it is checked whether the flag F1 is 1 or not. When the flag F1 is 1, it is checked whether the intake air mass flow Q is larger then the intake air mass flow Q2 or not, in step 77. If the intake air mass flow Q is equal to or smaller than the intake air mass flow Q2, it is checked whether engine speed N represented by the detection output signal Sn is higher than the engine speed N2 or not, in step 78.

When it is clarified in the step 77 that the intake air mass flow Q is larger than the intake air mass flow Q2 or it is clarified in the step 78 that the engine sped N is higher than the engine speed N2, the flag F2 is set to be 1 in step 79, and the control signal E2 is supplied to the three-way solenoid valve 31 so that the intake air relief valve 23 is closed, in step 80, then the process returns to the step 72. On the other hand, if the engine speed N is equal to or lower than the engine speed N2 as a result of the check in the step 78, the process returns to the step 72 directly from the step 78.

If it is clarified in the step 76 that the flag F1 is 0, it is checked whether the flag F2, F4 or F6 is 1 or not in step 81. When the flag F2, F4 or F6 is 1, it is further checked whether the flag F2 is 1 or not in step 82. Then, if the flag F2 is 1, it is checked whether the intake air mass flow Q is larger then the intake air mass flow Q4 or not, in step 83. If the intake air mass flow Q is equal to or smaller than the intake air mass flow Q4, it is checked whether the engine speed N is higher than the engine speed N4 or not, in step 84.

When it is clarified in the step 83 that the intake air mass flow Q is larger than the intake air mass flow Q4 or it is clarified in the step 84 that the engine speed N is higher than the engine speed N4, the flag F4 is set to be 1 in step 85, and the control signal E3 is supplied to the three-way solenoid valve 29 so that the exhaust cutoff valve 11 is opened, in step 86, then the process returns to the step 72.

On the other hand, if the engine speed N is equal to or lower than the engine speed N4 as a result of the check in the step 84, it is checked whether the intake air mass flow Q is smaller than the intake air mass flow Q1 or not, in step 87. If the intake air mass flow Q is smaller than the intake air mass flow Q1, it is further checked that the engine speed N is lower than the engine speed N1 or not, in step 88. When it is clarified in the step 87 that the intake air mass flow Q is equal to or larger than the intake air mass flow Q1 or it is clarified in the step 88 that the engine speed N is equal to or higher than the engine speed N1, the process returns to the step 72. On the other hand, if the engine speed N is lower than the engine speed N1 as a result of the check in the step 88, the flag F1 is set to be 1 in step 89, and the control signal E2 is supplied to the three-way solenoid valve 31 so that the intake air relief valve 23 is opened, in step 90, then the process returns to the step 72.

When it is clarified in the step 82 that the flag F2 is 0, it is checked whether the flag F4 is 1 or not in step 91. Then, if the flag F4 is 1, it is checked whether the intake air mass flow Q is larger then the intake air mass flow Q6 or not, in step 92. If the intake air mass flow Q is equal to or smaller than the intake air mass flow Q6, it is checked whether the engine speed N is higher than the engine speed N6 or not, in step 93.

When it is clarified in the step 92 that the intake air mass flow Q is larger than the intake air mass flow Q6 or it is clarified in the step 93 that the engine speed N is higher than the engine speed N6, the flag F6 is set to be 1 in step 94, and the control signal E1 is supplied to the three-way solenoid valve 27 so that the intake air cutoff valve 21 is opened, in step 95, then the process returns to the step 72. To the contrary, the engine speed N is equal to or lower than the engine speed N6 as a result of the check in the step 93, it is checked whether the intake air mass flow Q is smaller than the intake air mass flow Q3 or not, in step 96. If the intake air mass flow Q is smaller than the intake air mass flow Q3, it is further checked that the engine speed N is lower than the engine speed N3 or not, in step 97. When it is clarified in the step 96 that the intake air mass flow Q is equal to or larger than the intake air mass flow Q3 or it is clarified in the step 97 that the engine speed N is equal to or higher than the engine speed N3, the process returns to the step 72.

If the engine speed N is lower than the engine speed N3 as a result of the check in the step 97, the flag F3 is set to be 1 in step 98. Then, it is checked based on the detection output signal Ss whether the shifting-up operation performed in the transmission 50 is detected by the shifting-up detector 51 or not, in step 99. If the shifting-up operation performed in the transmission 50 is not detected, the process advances to step 102. On the other hand, if the shifting-up operation performed in the transmission 50 is detected, a timer contained in the control unit 35 is caused to start counting-down for measuring a predetermined period, in step 100. After that, it is checked in step 101 whether the counting-down by the timer has finished or not, that is, the predetermined period has passed or not. If the counting-down by the timer has not finished, the check in the step 101 is repeated. When the counting-down by the timer has finished, the process advances to the step 102.

In the step 102, the control signal E3 is supplied to the three-way solenoid valve 29 so that the exhaust cutoff valve 11 is closed. Then, the process returns to the step 72.

If it is clarified in the step 91 that the flag F4 is 0, it is checked whether the intake air mass flow Q is smaller than the intake air mass flow Q5 or not, in step 103. If the intake air mass flow Q is smaller than the intake air mass flow Q5, it is further checked that the engine speed N is lower than the engine speed N5 or not, in step 104. When it is clarified in the step 103 that the intake air mass flow Q is equal to or larger than the intake air mass flow Q5 or it is clarified in the step 104 that the engine speed N is equal to or higher than the engine speed N5, the process returns to the step 72.

If the engine speed N is lower than the engine speed N5 as a result of the check in the step 104, the flag F5 is set to be 1 in step 105. Then, it is checked based on the detection output signal Ss whether the shifting-up operation performed in the transmission 50 is detected by the shifting-up detector 51 or not, in step 106. If the shifting-up operation performed in the transmission 50 is not detected, the process advances to step 109. On the other hand, if the shifting-up operation performed in the transmission 50 is detected, the timer contained in the control unit 35 is caused to start counting-down for measuring the predetermined period, in step 107. After that, it is checked in step 108 whether the counting-down by the timer has finished or not, that is, the predetermined period has passed or not. If the counting-down by the timer has not finished, the check in the step 108 is repeated. When the counting-down by the timer has finished, the process advances to the step 109.

In the step 109, the control signal E1 is supplied to the three-way solenoid valve 27 so that the intake air cutoff valve 21 is closed. Then the process returns to the step 72.

Further, when it is clarified in the step 81 that none of the flags F2, F4 and F6 is 1, it is checked whether the flag F3 is 1 or not in step 110. Then, if the flag F3 is 1, it is checked whether the intake air mass flow Q is smaller than the intake air mass flow Q1 or not, in step 111. If the intake air mass flow Q is smaller than the intake air mass flow Q1, it is further checked that the engine speed N is lower than the engine speed N1 or not, in step 112. If the engine speed N is lower than the engine speed N1 as a result of the check in the step 112, the flag F1 is set to be 1 in step 113, and the control signal E2 is supplied to the three-way solenoid valve 31 so that the intake air relief valve 23 is opened, in step 114, then the process returns to the step 72.

When it is clarified in the step 111 that the intake air mass flow Q is equal to or larger than the intake air mass flow Q1 or it is clarified in the step 112 that the engine speed N is equal to or higher than the engine speed N1, it is checked whether the intake air mass flow Q is larger then the intake air mass flow Q4 or not, in step 115. If the intake air mass flow Q is equal to or smaller than the intake air mass flow Q4, it is checked whether the engine speed N is higher than the engine speed N4 or not, in step 116.

If the engine speed N is equal to or lower than the engine speed N4 as a result of the check in the step 116, the process returns to the step 72. On the other hand, if it is clarified in the step 115 that the intake air mass flow Q is larger than the intake air mass flow Q4 or it is clarified in the step 116 that the engine speed N is higher than the engine speed N4, the flag F4 is set to be 1 in step 117, and the control signal E3 is supplied to the three-way solenoid valve 29 so that the exhaust cutoff valve 11 is opened, in step 118, then the process returns to the step 72.

When it is clarified in the step 110 that the flag F3 is 0, it is checked whether the intake air mass flow Q is smaller than the intake air mass flow Q3 or not, in step 119. If the intake air mass flow Q is smaller than the intake air mass flow Q3, it is further checked that the engine speed N is lower than the engine speed N3 or not, in step 120. If the engine speed N is lower than the engine speed N3 as a result of the check in the step 120, the flag F3 is set to be 1 in step 121. Then, it is checked based on the detection output signal Ss whether the shifting-up operation performed in the transmission 50 is detected by the shifting-up detector 51 or not, in step 122. If the shifting-up operation performed in the transmission 50 is not detected, the process advances to step 125. On the other hand, if the shifting-up operation performed in the transmission 50 is detected, the timer contained in the control unit 35 is caused to start counting-down for measuring the predetermined period, in step 123. After that, it is checked in step 124 whether the counting-down by the timer has finished or not, that is, the predetermined period has passed or not. If the counting-down by the timer has not finished, the check in the step 124 is repeated. When the counting-down by the timer has finished, the process advances to the step 125.

In the step 125, the control signal E3 is supplied to the three-way solenoid valve 29 so that the exhaust cutoff valve 11 is closed. Then, the process returns to the step 72.

When it is clarified in the step 119 that the intake air mass flow Q is equal to or larger than the intake air mass flow Q3 or it is clarified in the step 120 that the engine speed N is equal to or higher than the engine speed N3, it is checked whether the intake air mass flow Q is larger then the intake air mass flow Q6 or not, in step 126. If the intake air mass flow Q is equal to or smaller than the intake air mass flow Q6, it is checked whether the engine speed N is higher than the engine speed N6 or not, in step 127.

If the engine speed N is equal to or lower than the engine speed N6 as a result of the check in the step 127, the process returns to the step 72. On the other hand, if it is clarified in the step 126 that the intake air mass flow Q is larger than the intake air mass flow Q6 or it is clarified in the step 127 that the engine sped N is higher than the engine speed N6, the flag F6 is set to be 1 in step 128, and the control signal E1 is supplied to the three-way solenoid valve 27 so that the intake air cutoff valve 21 is opened, in step 129, then the process returns to the step 72.

Figure 6:
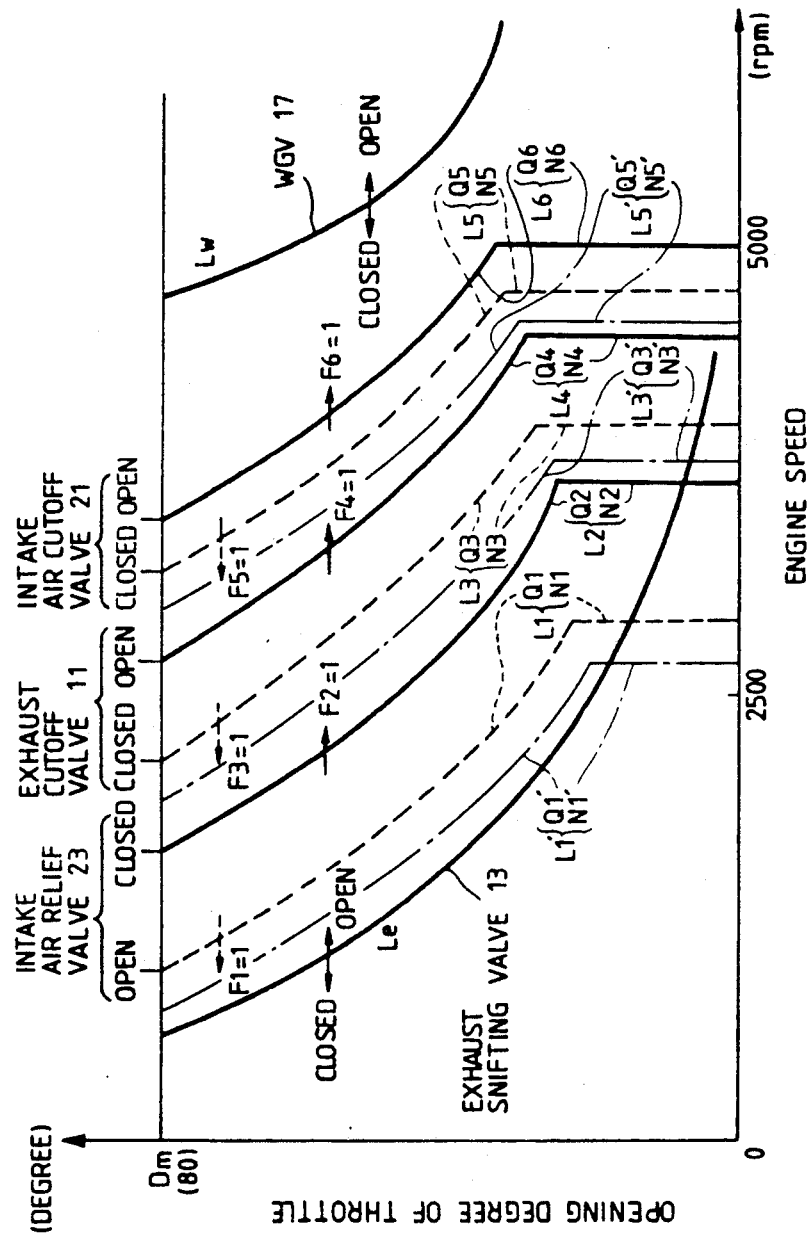
FIG. 6 is a characteristic chart used for explaining the operation of various valves employed in the embodiment shown in FIG. 2 and controlled in a second control manner.

The exhaust cutoff valve 11, exhaust snifting valve 13, waste gate valve 17, intake air cutoff valve 21 and intake air relief valve 23 employed in the embodiment shown in FIG. 2 can be subjected also to a control performed by the control unit 35 in a different manner from the above described control. FIG. 6 is another characteristic chart showing the operating conditions of the exhaust cutoff valve 11, exhaust snifting valve 13, waste gate valve 17, intake air cutoff valve 21 and intake air relief valve 23 which are controlled in such a different manner.

The characteristic chart of FIG. 6 is obtained by adding lines L1′, L3′ and L5′ to the characteristic chart of FIG. 4. The line L1′ is obtained by shifting the line L1 toward the line Le and indicates the operating condition of engine in which the engine 1 operates with intake air mass flow Q1′ which is smaller than the intake air mass flow Q1 and the operating condition of engine in which the engine 1 operates at engine speed N1′ which is lower than the engine speed N1. The line L3′ is obtained by shifting the line L3 toward the line L2 and indicates the operating condition of engine in which the engine 1 operates with intake air mass flow Q3′ which is smaller than the intake air mass flow Q3 and the operating condition of engine in which the engine 1 operates at engine speed N3′ which is lower than the engine speed N3. The line L5′ is obtained by shifting the line L5 toward the line L4 and indicates the operating condition of engine in which the engine 1 operates with intake air mass flow Q5′ which is smaller than the intake air mass flow Q5 and the operating condition of engine in which the engine 1 operates at engine speed N5′ which is lower than the engine speed N5.

In the control conducted in accordance with the characteristic chart of FIG. 6, when the shifting-up operation in the transmission 50 is not detected by the shifting-up detector 51, the waste gate valve 17 and exhaust snifting valve 13 are controlled to operate in accordance with the lines Lw and Le, respectively, and the intake air relief valve 23, exhaust cutoff valve 11 and intake air cutoff valve 21 are controlled to operate in accordance with the lines L1 to L6 in such a manner as described above with reference to the characteristic chart of FIG. 4. On the other hand, when the shifting-up operation in the transmission 50 is detected by the shifting-up detector 51, the exhaust cutoff valve 11 and exhaust snifting valve 13 are also controlled to operate in accordance with the lines Lw and Le, respectively, however, the intake air relief valve 23 is changed to be closed from open in accordance with the line L2 and to be open from closed in accordance with the line L1′, the exhaust cutoff valve 11 is changed to be open from closed in accordance with the line L4 and to be closed from open in accordance with the line L3′, and the intake air cutoff valve 21 is changed to be open from closed in accordance with the line L6 and to be closed from open in accordance with the line L5′.

Since the intake air cutoff valve 21 and exhaust cutoff valve 11 are changed to be closed from open in accordance with the lines L5′ and L3′, respectively, and the intake air relief valve 23 is changed to be open from closed in accordance with the line L1′ when the shifting-up operation is detected by the shifting-up detector 51, an operating area on the characteristic chart of FIG. 6 corresponding to the operating condition of the engine 1 wherein the primary and secondary turbosuperchargers 9 and 10 work simultaneously is extended toward operating areas of smaller opening degree of throttle and lower engine speed, so that the secondary turbosupercharger 10 is thus restrained to stop working when the shifting-up operating is performed in the transmission 50. Therefore, torque produced by the engine 1 is not steeply reduced and therefore torque shock arising in the engine 1 and the transmission 50 is surely suppressed when the shifting-up operation is performed in the transmission 50 and thereby the engine speed is reduced.

One example of an operation program for controlling the exhaust cutoff valve 11, intake air cutoff valve 21 and intake air relief valve 23 in accordance with the characteristic chart of FIG. 6 as described above is carried out in the control unit 35 with reference to a flow chart shown in FIGS. 7-a, 7-b and 7-c.

According to the flow chart shown in FIGS. 7-a, 7-b and 7-c, first, in step 171, an initial arrangement for setting a flag F1 to be 1 and setting each of flags F2 to F6 to be 0 is conducted. As shown in FIG. 6, after the initial arrangement, the flag F1 is set to be 1 and each of the flags F2 to F6 is set to be 0 when the intake air mass flow or the engine speed is decreased to cross the line L1 or L1′, the flag F2 is set to be 1 and each of the flags F1 and F3 to F6 is set to be 0 when the intake air mass flow or the engine speed is increased to cross the line L2, the flag F3 is set to be 1 and each of the flags F1, F2 and F4 to F6 is set to 0 when the intake air mass flow or the engine speed is decreased to cross the line L3 or L3′, the flag F4 is set to be 1 and each of the flags F1 to F3, F5 and F6 is set to be 0 when the intake air mass flow or the engine speed is increased to cross the line L4, the flag F5 is set to be 1 and each of the flags F1 to F4 and F6 is set to be 0 when the intake air mass flow or the engine speed is decreased to cross the line L5 or L5′, and the flag F6 is set to be 1 and each of the flags F1 to F5 is set to be 0 when the intake air mass flow or the engine speed is increased to cross the line L6.

Then, in step 172, the detection output signals Sa, Sn, Ss, St and Sp1 obtained from the air flow sensor 4, the engine speed detector 61, the shifting-up detector 51, the throttle sensor 62 and the air pressure sensor 63, respectively, are stored. Next, in step 221, it is checked based on the detection output signal Ss whether the shifting-up operation performed in the transmission 50 is detected by the shifting-up detector 51 or not. If the shifting-up operation performed in the transmission 50 is not detected, the process advances directly to step 173. On the other hand, if the shifting-up operation performed in the transmission 50 is detected, the intake air mass flows Q1, Q3 and Q5 and the engine speeds N1, N3 and N5 are changed respectively into the intake air mass flows Q1', Q3' and Q5' and the engine speeds N1', N3' and N5' so that the lines L1, L3 and L5 are shifted to the lines L1', L3' and L5', respectively, in step 222, and then the process advances to the step 173.

In the step 173, the intake air mass flow Q1 and the engine speed N1 representing the line L1, the intake air mass flow Q2 and the engine speed N2 representing the line L2, the intake air mass flow Q3 and the engine speed N3 representing the line L3, the intake air mass flow Q4 and the engine speed N4 representing the line L4, the intake air mass flow Q5 and the engine speed N5 representing the line L5, and the intake air mass flow Q6 and the engine speed N6 representing the line L6 are stored.

After that, in step 174, it is checked whether the variation rate of intake air mass flow (dQ/dt), which is obtained based on the detection output signal Sa representing intake air mass flow Q in the intake passage 3, is lager than a predetermined value AA or not. If the variation rate of intake air mass flow dQ/dt is larger than the predetermined value AA, the intake air mass flows Q1, Q2, Q3, Q4, Q5 and Q6 and the engine speeds N1, N2, N3, N4, N5 and N6 stored in the step 173 are modified respectively to shift the lines L1 to L6 toward areas of smaller opening degree of throttle and lower engine speed on the characteristic chart of FIG. 6, in step 175, and then the process advances to step 176. The modifications of the intake air mass flows Q1 to Q6 are performed by subtracting predetermined modifying values ΔQ1, ΔQ2, ΔQ3, ΔQ4, ΔQ5 and ΔQ6 from the intake air mass flows Q1, Q2, Q3, Q4, Q5 and Q6, respectively, and the modifications of the engines speeds N1 to N6 are performed by subtracting predetermined modifying values ΔN1, ΔN2, ΔN3, ΔN4, ΔN5 and ΔN6 from the engine speeds N1, N2, N3, N4, N5 and N6, respectively.

If it is clarified in the step 174 that the variation rate of intake air mass flow dQ/dt is equal to or smaller than the predetermined value AA, the process advances directly to step 176.

In the step 176, it is checked whether the flag F1 is 1 or not. When the flag F1 is 1, it is checked whether the intake air mass flow Q is larger than the intake air mass flow Q2 or not, in step 177. If the intake air mass flow Q is equal to or smaller than the intake air mass flow Q2, it is checked whether engine speed N represented by the detection output signal Sn is higher than the engine speed N2 or not, in step 178.

When it is clarified in the step 177 that the intake air mass flow Q is larger than the intake air mass flow Q2 or it is clarified in the step 178 that the engine sped N is higher than the engine speed N2, the flag F2 is set to be 1 in step 179, and the control signal E2 is supplied to the three-way solenoid valve 31 so that the intake air relief valve 23 is closed, in step 180, then the engine speed N is equal to or lower than the engine speed N2 as a result of the check in the step 178, the process returns to the step 172 directly from the step 178.

If it is clarified in the step 176 that the flag F1 is 0, it is checked whether the flag F2, F4 or F6 is 1 or not in step 181. When the flag F2, F4 or F6 is 1, it is further checked whether the flag F2 is 1 or not in step 182. Then, if the flag F2 is 1, it is checked whether the intake air mass flow Q is larger then the intake air mass flow Q4 or not, in step 183. If the intake air mass flow Q is equal to or smaller than the intake air mass flow Q4, it is checked whether the engine speed N is higher than the engine speed N4 or not, in step 184.

When it is clarified in the step 183 that the intake air mass flow Q is larger than the intake air mass flow Q4 or it is clarified in the step 184 that the engine speed N is higher than the engine speed N4, the flag F4 is set to be 1 in step 185, and the control signal E3 is supplied to the three-way solenoid valve 29 so that the exhaust cutoff valve 11 is opened, in step 186, then the process returns to the step 172.

On the other hand, if the engine speed N is equal to or lower than the engine speed N4 as a result of the check in the step 184, it is checked whether the intake air mass flow Q is smaller than the intake air mass flow Q1 or not, in step 187. If the intake air mass flow Q is smaller than the intake air mass flow Q1, it is further checked that the engine speed N is lower than the engine speed N1 or not, in step 188. When it is clarified in the step 187 that the intake air mass flow Q is equal to or larger than the intake air mass flow Q1 or it is clarified in the step 188 that the engine speed N is equal to or higher than the engine speed N1, the process returns to the step 172. On the other hand, if the engine speed N is lower than the engine speed N1 as a result of the check in the step 188, the flag F1 is set to be 1 in step 189, and the control signal E2 is supplied to the three-way solenoid valve 31 so that the intake air relief valve 23 is opened, in step 190, then the process returns to the step 172.

When it is clarified in the step 182 that the flag F2 is 0, it is checked whether the flag F4 is 1 or not in step 191. Then, if the flag F4 is 1, it is checked whether the intake air mass flow Q is larger than the intake air mass flow Q6 or not, in step 192. If the intake air mass flow Q is equal to or smaller than the intake air mass flow Q6, it is checked whether the engine speed N is higher than the engine speed N6 or not, in step 193.

When it is clarified in the step 192 that the intake air mass flow Q is larger than the intake air mass flow Q6 or it is clarified in the step 193 that the engine speed N is higher than the engine speed N6, the flag F6 is set to be 1 in step 194, and the control signal E1 is supplied to the three-way solenoid valve 27 so that the intake air cutoff valve 21 is opened, in step 195, then the process returns to the step 172. To the contrary, the engine speed N is equal to or lower than the engine speed N6 as a result of the check in the step 193, it is checked whether the intake air mass flow Q is smaller than the intake air mass flow Q3 or not, instep 196. If the intake air mass flow Q is smaller than the intake air mass flow Q3, it is further checked that the engine speed N is lower than the engine speed N3 or not, in step 197. When it is clarified in the step 196 that the intake air mass flow Q is equal to or larger than the intake air mass flow Q3 or it is clarified in the step 197 that the engine speed N is equal to or higher than the engine speed N3, the process returns to the step 172.

If the engine speed N is lower than the engine speed N3 as a result of the check in the step 197, the flag F3 is set to be 1 in step 198, and the control signal E3 is supplied to the three-way solenoid valve 29 so that the exhaust cutoff valve 11 is closed, in step 199, then the process returns to the step 172.

If it is clarified in the step 191 that the flag F4 is 0, it is checked whether the intake air mass flow Q is smaller than the intake air mass flow Q5 or not, in step 200. If the intake air mass flow Q is smaller than the intake air mass flow Q5, it is further checked that the engine speed N is lower than the engine speed N5 or not, in step 201. When it is clarified in the step 200 that the intake air mass flow Q is equal to or larger than the intake air mass flow Q5 or it is clarified in the step 201 that the engine speed N is equal to or higher than the engine speed N5, the process returns to the step 172.

If the engine speed N is lower than the engine speed N5 as a result of the check in the step 201, the flag F5 is set to be 1 in step 202, and the control signal E1 is supplied to the three-way solenoid valve 27 so that the intake air cutoff valve 21 is closed, in step 203, then the process returns to the step 172.

Further, when it is clarified in the step 181 that none of the flags F2, F4 and F6 is 1, it is checked whether the flag F3 is 1 or not in step 204. Then, if the flag F3 is 1, it is checked whether the intake air mass flow Q is smaller than the intake air mass flow Q1 or not, in step 205. If the intake air mass flow Q is smaller than the intake air mass flow Q1, it is further checked that the engine speed N is lower than the engine speed N1 or not, in step 206. If the engine speed N is lower than the engine speed N1 as a result of the check in the step 206, the flag F1 is set to be 1 in step 207, and the control signal E2 is supplied to the three-way solenoid valve 31 so that the intake air relief valve 23 is opened, in step 208, then the process returns to the step 172.

When it is clarified in the step 205 that the intake air mass flow Q is equal to or larger than the intake air mass flow Q1 or it is clarified in the step 206 that the engine speed N is equal to or higher than the engine speed N1, it is checked whether the intake air mass flow Q is larger then the intake air mass flow Q4 or not, in step 209. If the intake air mass flow Q is equal to or smaller than the intake air mass flow Q4, it is checked whether the engine speed N is higher than the engine speed N4 or not, in step 210.

If the engine speed N is equal to or lower than the engine speed N4 as a result of the check in the step 210, the process returns to the step 172. On the other hand, if it is clarified in the step 209 that the intake air mass flow Q is larger than the intake air mass flow Q4 or it is clarified in the step 210 that the engine speed N is higher than the engine speed N4, the flag F4 is set to be 1 in step 211, and the control signal E3 is supplied to the three-way solenoid valve 29 so that the exhaust cutoff valve 11 is opened, in step 212, then the process returns to the step 172.

When it is clarified in the step 204 that the flag F3 is 0, it is checked whether the intake air mass flow Q is smaller than the intake air mass flow Q3 or not, in step 213. If the intake air mass flow Q is smaller than the intake air mass flow Q3, it is further checked that the engine speed N is lower than the engine speed N3 or not, in step 214. If the engine speed N is lower than the engine speed N3 as a result of the check in the step 214, the flag F3 is set to be 1 in step 215, and the control signal E3 is supplied to the three-way solenoid valve 29 so that the exhaust cutoff valve 11 is closed, in step 216, then the process returns to the step 172.

When it is clarified in the step 213 that the intake air mass flow Q is equal to or larger than the intake air mass flow Q3 or it is clarified in the step 214 that the engine speed N is equal to or higher than the engine speed N3, it is checked whether the intake air mass flow Q is larger then the intake air mass flow Q6 or not, in step 217. If the intake air mass flow Q is equal to or smaller than the intake air mass flow Q6, it is checked whether the engine speed N is higher than the engine speed N6 or not, in step 218.

If the engine speed N is equal to or lower than the engine speed N6 as a result of the check in the step 218, the process returns to the step 172. On the other hand, if it is clarified in the step 217 that the intake air mass flow Q is larger than the intake air mass flow Q6 or it is clarified in the step 218 that the engine sped N is higher than the engine speed N6, the flag F6 is set to be 1 in step 219, and the control signal E1 is supplied to the three-way solenoid valve 27 so that the intake air cutoff valve 21 is opened, in step 220, then the process returns to the step 172.

What is claimed is:

1. An air supply control system for an internal combustion engine comprising:
   supercharging means provided for supercharging the internal combustion engine and operative to work with supercharging capacity varying in accordance with operating condition of the internal combustion engine,
   engine speed detecting means for detecting speed of the internal combustion engine,
   shifting-up detecting means for detecting a shifting-up operation performed in a transmission coupled with the internal combustion engine,
   supercharging capacity changing means operative to vary the supercharging capacity of said supercharging means to be reduced when the speed of the internal combustion engine detected by said engine speed detecting means is relatively low and to be increased when the speed of the internal combustion engine detected by said engine speed detecting means is relatively high, and
   supercharging capacity change control means for restraining said supercharging capacity changing means from varying the supercharging capacity of said supercharging means to be reduced when the shifting-up operation is detected by said shifting-up detection means,
   wherein said supercharging capacity change control means is operative to restrain said supercharging capacity changing means from varying the supercharging capacity of said supercharging means to be reduced for a predetermined period after the shifting-up operation when the shifting-up operating is detected by said shifting-up detecting means.

2. An air supply control system for an internal combustion engine comprising:
   first and second turbosuperchargers for supercharging the internal combustion engine, said first and second turbosuperchargers having turbines disposed respectively in first and second separated exhaust passages connected with the internal combustion engine and blowers disposed respectively in first and second separated intake passages connected with the internal combustion engine, shifting-up operation performed in a transmission coupled with the internal combustion engine,
   supercharging capacity changing means operative to cause said second turbosupercharger to be inoperative when the speed of the internal combustion engine detected by said engine speed detecting means is relatively low and to cause said second turbosupercharger to work for supercharging the internal combustion engine detected by said engine speed detecting means is relatively high, and supercharging capacity change control means for restraining said supercharging capacity changing means from causing said second turbosupercharger to be inoperative when the shifting-up operation is detected by said shifting-up detecting means, said supercharging capacity change control means is operative to restrain said supercharging capacity changing means from causing said second turbosupercharger to be inoperative for a predetermined period after the shifting-up operation when the shifting-up operation is detected by said shifting-up detecting means.

3. An air supply control system according to claim 2, wherein said supercharging capacity changing means comprises an exhaust cutoff valve operative selectively to be open and closed respectively for opening and closing said second separated exhaust passage, an intake air cutoff valve operative selectively to be open and closed respectively for opening and closing said second separated intake passage, and cutoff valve control means operative to cause both said exhaust cutoff valve and said intake air cutoff valve to be closed so that said first turbosupercharger works for supercharging the internal combustion engine but the second turbosupercharger is caused to be inoperative when the speed of the internal combustion engine detected by said engine speed detecting means is relatively low and to cause both said exhaust cutoff valve and said intake air cutoff valve to be open so that said first and second turbosuperchargers work for supercharging the internal combustion engine when the speed of the internal combustion engine detected by said engine speed detecting means is relatively high, and said supercharging capacity change control means is operative to restrain said cutoff valve control means from causing both said exhaust cutoff valve and said intake air cutoff valve to be closed when the shifting-up operation is detected by said shifting-up detecting means.

4. An air supply control system according to claim 3, wherein said supercharging capacity change control means includes a timer for measuring said predetermined period after the shifting-up operation.

5. An air supply control system according to claim 3, wherein said cutoff valve control means is operative to detect, based on the speed of the internal combustion engine detected by said engine speed detecting means, one of predetermined operating areas provided on an operating characteristic chart of the internal combustion engine in which an actual operating condition of the internal combustion engine resides and to control respectively said exhaust cutoff valve and said intake air cutoff valve in accordance with the detected operating area.

6. An air supply control system according to claim 5, wherein said cutoff valve control means is operative to cause both said exhaust cutoff valve and said intake air cutoff valve to be closed when said detected operating area is a first operating area corresponding to an operating condition of the internal combustion engine in which only the first turbosupercharger is to work and to cause both said exhaust cutoff valve and said intake air cutoff valve to be open when said detected operating area is a second operating area corresponding to an operating condition of the internal combustion engine in which the first and second turbosuperchargers are to work simultaneously.

7. An air supply control system according to claim 6, wherein said operating characteristic chart shows the operating areas on a coordinate plane defined by coordinate axes representing/respectively engine speed and engine load.

8. An air supply control system according to claim 7, wherein said supercharging capacity change control means is operative to extend said second operating area toward areas of lower engine speed on said operating characteristic chart when the shifting-up operation is detected by said shifting-up detecting means.

9. An air supply control system according to claim 7, wherein said engine load defining the coordinate plane shown by the operating characteristic chart is embodied by openings degree of throttle in the internal combustion engine.

10. An air supply control system for an internal combustion engine comprising:

supercharging means provided for supercharging the internal combustion engine and operative to work with supercharging capacity varying in accordance with operating condition of the internal combustion engine, engine speed detecting means for detecting speed of the internal combustion engine, shifting-up detecting means for detecting a shifting-up operation performed in a transmission coupled with the internal combustion engine, supercharging capacity changing means operative to vary the supercharging capacity of said supercharging means to be reduced when the speed of the internal combustion engine detected by said engine speed detecting means is relatively low and to be increased when the speed of the internal combustion engine detected by said engine speed detecting means is relatively high, and supercharging capacity change control means operative to restrain said supercharging capacity changing means so as to vary the supercharging capacity of said supercharging means to be slowly reduced when the shifting-up operation is detected by said shifting-up means detecting means as compared with non-shift-up operation.

11. An air supply control system for an internal combustion engine comprising:

first and second turbosuperchargers for supercharging the internal combustion engine, said first and second turbosuperchargers having turbines disposed respectively in first and second separated exhaust passages connected with internal combustion engine and blowers disposed respectively in first and second separated intake passages connected with the internal combustion engine, engine speed detecting means for detecting speed of the internal combustion engine, shifting-up detecting means for detecting a shifting-up operation performed in a transmission coupled with the internal combustion engine, supercharging capacity changing means operative to cause said second turbosupercharger to be inoperative when the speed of the internal combustion engine detected by said engine speed detecting means is relatively low and to cause said second turbosupercharger to work for supercharging the internal combustion engine when the speed of the internal combustion engine detected by said engine speed detecting means is relatively high, and supercharging capacity change control means for operative to restrain said supercharging capacity changing means so as to slowly change said second turbosupercharger to be inoperative when the shifting-up operation is detected by said shifting-up detecting means as compared with non-shift-up operation.

* * * * *